(12) United States Patent
Sakai

(10) Patent No.: US 8,542,652 B2
(45) Date of Patent: Sep. 24, 2013

(54) COMMUNICATION USING SHARED COMMUNICATION PARAMETERS WHICH REDUCES UNEXPECTED COMMUNICATION DEVICE CONNECTIONS WHILE CONDUCTING AUTO CONFIGURATION

(75) Inventor: Tatsuhiko Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 244 days.

(21) Appl. No.: 12/811,376

(22) PCT Filed: Feb. 18, 2009

(86) PCT No.: PCT/JP2009/053300
§ 371 (c)(1),
(2), (4) Date: Jun. 30, 2010

(87) PCT Pub. No.: WO2009/104796
PCT Pub. Date: Aug. 27, 2009

(65) Prior Publication Data
US 2010/0284296 A1    Nov. 11, 2010

(30) Foreign Application Priority Data
Feb. 19, 2008    (JP) .................................. 2008-037415

(51) Int. Cl.
*H04W 4/00*    (2009.01)
(52) U.S. Cl.
USPC ............ 370/331; 370/217; 370/328; 370/329
(58) Field of Classification Search
None
See application file for complete search history.

(56) References Cited

U.S. PATENT DOCUMENTS

| 7,193,989 | B2 | 3/2007 | Melpignano | 370/350 |
|---|---|---|---|---|
| 7,193,991 | B2 | 3/2007 | Melpignano | 370/352 |
| 7,882,234 | B2 | 2/2011 | Watanabe et al. | |
| 8,250,218 | B2 | 8/2012 | Watanabe et al. | |
| 2003/0003912 | A1 | 1/2003 | Melpignano et al. | |
| 2003/0065757 | A1* | 4/2003 | Mentze et al. | 709/222 |
| 2003/0179750 | A1* | 9/2003 | Hasty et al. | 370/390 |
| 2006/0239236 | A1 | 10/2006 | Otsuka | 370/338 |
| 2007/0043844 | A1 | 2/2007 | Sakai | |

(Continued)

FOREIGN PATENT DOCUMENTS

| EP | 1 819 102 A1 | 8/2007 |
|---|---|---|
| JP | 2004328289 A | 11/2004 |

(Continued)

OTHER PUBLICATIONS

Wi-Fi Alliance, "Wi-Fi Certified for Wi-Fi Protected Setup: Easing the User Experience for Home and Small Office Wi-Fi Networks", 2007.

(Continued)

*Primary Examiner* — Donald Mills
(74) *Attorney, Agent, or Firm* — Fitzpatrick, Cella, Harper & Scinto

(57) ABSTRACT

A communication apparatus includes: providing means for providing communication parameters to a receiving apparatus to be provided with communication parameters; determination means for determining whether there are a plurality of providing apparatuses that provide the communication parameters; and notifying means for, in case the determination means determines that there are the plurality of apparatuses, notifying the receiving apparatus that the providing means have already provided with the communication parameters of a notification that instructs the apparatus to halt the usage of the provided communication parameters.

12 Claims, 9 Drawing Sheets

(56) References Cited

U.S. PATENT DOCUMENTS

| | | | |
|---|---|---|---|
| 2007/0189322 A1 | 8/2007 | Hirose | 370/447 |
| 2007/0265009 A1* | 11/2007 | Hamaguchi | 455/436 |
| 2009/0080390 A1* | 3/2009 | Zhou et al. | 370/338 |
| 2010/0228868 A1 | 9/2010 | Sakai | |
| 2012/0270587 A1 | 10/2012 | Watanabe et al. | |

FOREIGN PATENT DOCUMENTS

| | | |
|---|---|---|
| JP | 2004-536495 | 12/2004 |
| JP | 2006-303924 | 11/2006 |
| JP | 2006352282 A | 12/2006 |
| JP | 2007-215005 | 8/2007 |

OTHER PUBLICATIONS

U.S. Appl. No. 12/666,277, filed Dec. 22, 2009, Applicant: T. Sakai.
U.S. Appl. No. 12/808,348, filed Jun. 15, 2010, Applicant T. Sakai.
U.S. Appl. No. 12/808,347, filed Jun. 15, 2010, Applicant T. Sakai.
"Touch-and-Connect: A Connection Request Framework for the Ubiquitous Computing Environment", IPSJ Journal, Information Processing Society of Japan, vol. 45, No. 12, Dec. 15, 2004, pp. 2642-2654.

* cited by examiner

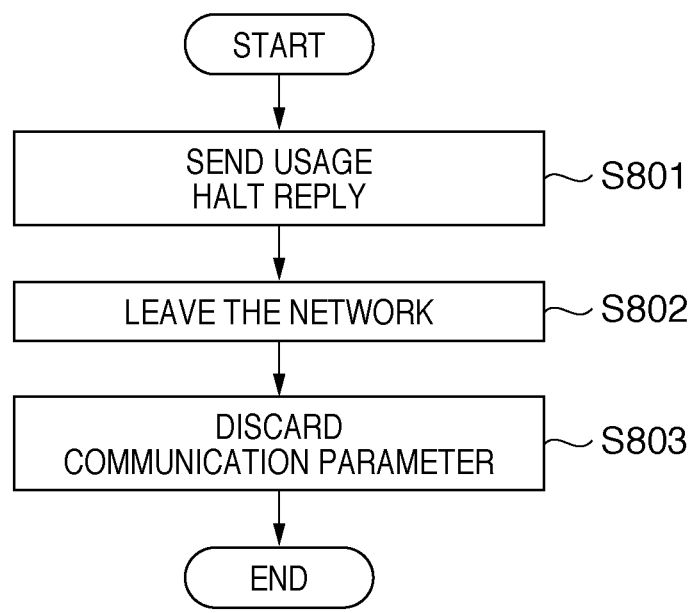

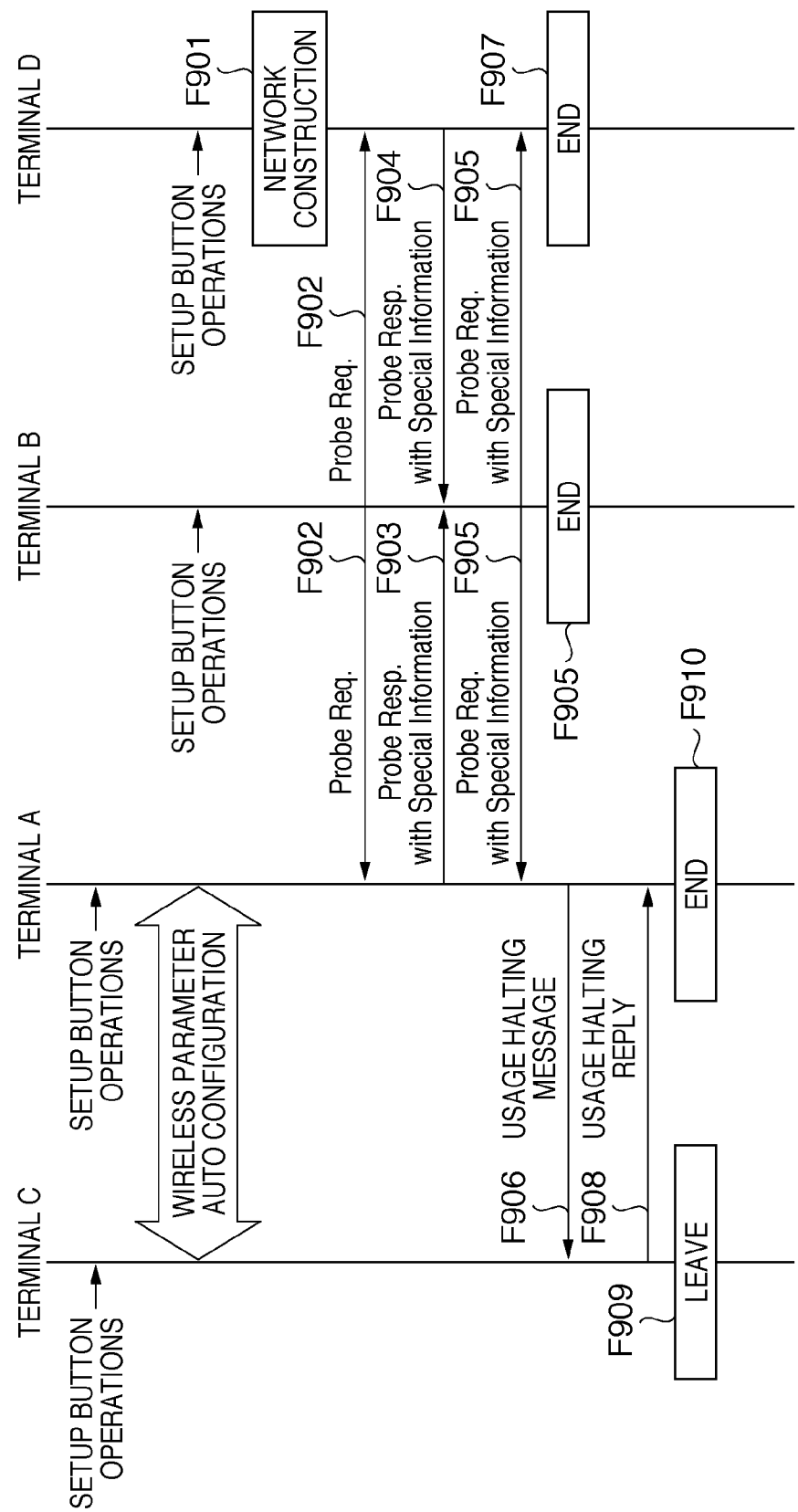

COMMUNICATION USING SHARED COMMUNICATION PARAMETERS WHICH REDUCES UNEXPECTED COMMUNICATION DEVICE CONNECTIONS WHILE CONDUCTING AUTO CONFIGURATION

TECHNICAL FIELD

The present invention relates to communication apparatus, communication method, program and storage medium.

BACKGROUND ART

Many parameters needed to be configured before using wireless LAN, which is representative of the wireless communication protocols compliance with series of IEEE 802.11 standard.

As an example, communication parameters such as network identifier, encryption method, encryption key, authentication method and authentication key can be given as many cumbersome parameter settings needed to be conducted manually by a user.

Thus, many wireless network device makers have proposed auto-configuration methods, for easy configuration of the wireless network device parameters. These auto configuration methods conduct auto parameter configuration by using predefined communication steps and messaging between network devices where the parameters are provided from one device to another automatically.

A example of auto parameter configuration is described in Wi-Fi Certified™ for Wi-Fi Protected Setup: Easing the User Experience for Home and Small Office Wifi® Networks, http://www.wi-fi.org/wp/wifi-protected-setup (hereinafter: WiFi Protected Setup Document)

Moreover, according to one method, when there are more than one device participating to the network, a device is selected for providing parameters (hereinafter: providing apparatus) among the devices, and then provides the communication parameters to the other devices (hereinafter: receiving apparatus) from the providing apparatus.

Japanese Patent Laid-Open No. 2006-352282 discloses an example of parameter auto configuration method when there are more than two devices.

According to auto-parameter setting of Wi-Fi Protected Setup document, the auto-parameter setting is started by pressing a setup starting button on the device, auto parameter setting is conducted with the devices started the set-up phase in a similar manner within the setup period.

Authentication between the devices using such as password, is not conducted in this method of auto-parameter configuration by button pressing.

Thus, in case there is a plurality of users conducting auto-parameter configuration within a close proximity, based on auto parameter configuration starting time and closeness, it is possible to occur auto parameter configurations between unexpected devices.

As a preventing mechanism of such a fault auto parameter configurations, ending the process with an error signal is considered when there is a plurality of devices.

Here, when there are more than two devices conducting auto parameter configuration, a case where the rest of the receiving apparatus and providing apparatus are turned on after a part of the receiving apparatuses are auto configured by one providing apparatus is considered. In this case, a receiving apparatus which has not yet conducted to the auto parameter configuration detects a plurality of providing apparatus. However, there might be other receiving apparatus already finish auto parameter configuration before the detection. Thus, there might be unexpected receiving apparatus auto parameter configured by unexpected providing apparatus.

In currently available conventional communication parameter auto configuration methods there is no method to detect already auto configured receiving apparatus receiving new auto configuration parameters from another providing apparatus.

Moreover, when multiple communication parameter auto configuration is conducted simultaneously, there is a possibility having unexpected providing apparatus configuring unexpected receiving apparatus before the existence of multiple providing apparatus get detected and process end with an error.

As mentioned above, when there are multiple providing apparatus, there is a possibility of receiving apparatus getting auto configured in an unexpected manner. Even in case when the multiple providing apparatus existence get detected and process is ended with an error, still there is a possibility of getting receiving apparatus configured in an unexpected manner due to the above mention reason. Thus, the problem of possible unexpected network establishments in case conventional auto configuration is conducted, still exists.

Moreover, when providing apparatus change the communication parameters after error ending, the devices already received the communication parameters keep its old parameter in the storage unit. Due to this reason, conducting unnecessary connections to unusable networks and unnecessary parameter consummation of the memory area is occurred.

DISCLOSURE OF INVENTION

Present invention intends to solve the problems arise when multiple providing apparatus is conducting communication parameter auto configuration. As an example, it prevents unexpected communication device connections while conducting the network parameter auto configuration.

According to one aspect of the present invention, a communication apparatus includes: providing means for providing communication parameters to a receiving apparatus to be provided with communication parameters; determination means for determining whether there are a plurality of providing apparatuses that provide the communication parameters; and notifying means for, in case the determination means determines that there are the plurality of apparatuses, notifying the receiving apparatus that the providing means have already provided with the communication parameters of a notification that instructs the apparatus to halt the usage of the provided communication parameters.

According to another aspect of the present invention, a communication apparatus includes: receiving means for receiving communication parameters from a providing apparatus that provides the communication parameters; halting means for halting the usage of the communication parameters received by the receiving means, if the communication apparatus is notified of a communication parameter halting notification by the providing apparatus after the receiving means has received the communication parameters from the providing apparatus.

According to still another aspect of the present invention, a communication method for a communication apparatus includes the steps of: providing communication parameters to a receiving apparatus to be provided with communication parameters; determining whether there are a plurality of providing apparatuses that provide the communication parameters; and notifying, in case that it is determined in the step of determining that there are the plurality of apparatuses, the receiving apparatus that has already been provided with the communication parameters in the step of providing of a notification that instructs the apparatus to halt the usage of the provided communication parameters.

According to yet another aspect of the present invention, a communication method for a communication apparatus includes the steps of: receiving communication parameters from a providing apparatus that provides the communication parameters; halting means for halting the usage of the communication parameters received by the receiving means, if the communication apparatus is notified of a communication parameter halting notification by the providing apparatus after the communication parameters have been received from the providing apparatus.

According to still yet another aspect of the present invention, a program for causing a communication method for a communication apparatus to be executed by a computer, the method includes: providing communication parameters to a receiving apparatus to be provided with communication parameters; determining whether there are a plurality of providing apparatuses that provide the communication parameters; and notifying, in case that it is determined in the step of determining that there are the plurality of apparatuses, the receiving apparatus that has already been provided with the communication parameters in the step of providing of a notification that instructs the apparatus to halt the usage of the provided communication parameters.

According to yet still another aspect of the present invention, a program for causing a communication method for a communication apparatus to be executed by a computer, the method includes: receiving communication parameters from a providing apparatus that provides the communication parameters; halting means for halting the usage of the communication parameters received by the receiving means, if the communication apparatus is notified of a communication parameter halting notification by the providing apparatus after the communication parameters have been received from the providing apparatus.

Further features of the present invention will become apparent from the following description of exemplary embodiments (with reference to the attached drawings).

BRIEF DESCRIPTION OF DRAWINGS

FIG. 8 is a flowchart showing a communication parameter usage halting process flow of the receiving apparatus; and FIG. 9 is a sequence diagram showing the operations of terminal A, terminal B, terminal C, and terminal D of the present embodiment.

BEST MODE FOR CARRYING OUT THE INVENTION

1$^{st}$ Embodiment

Here, the communication devices according to the first embodiment will be explained in detail, while refereeing to the figures. The explanation is given using an example based on IEEE 802.11 series wireless LAN system, however present invention does not limited to IEEE 802.11 wireless LAN family.

The preferred hardware construction of exemplary embodiment is described below.

Figure 1:
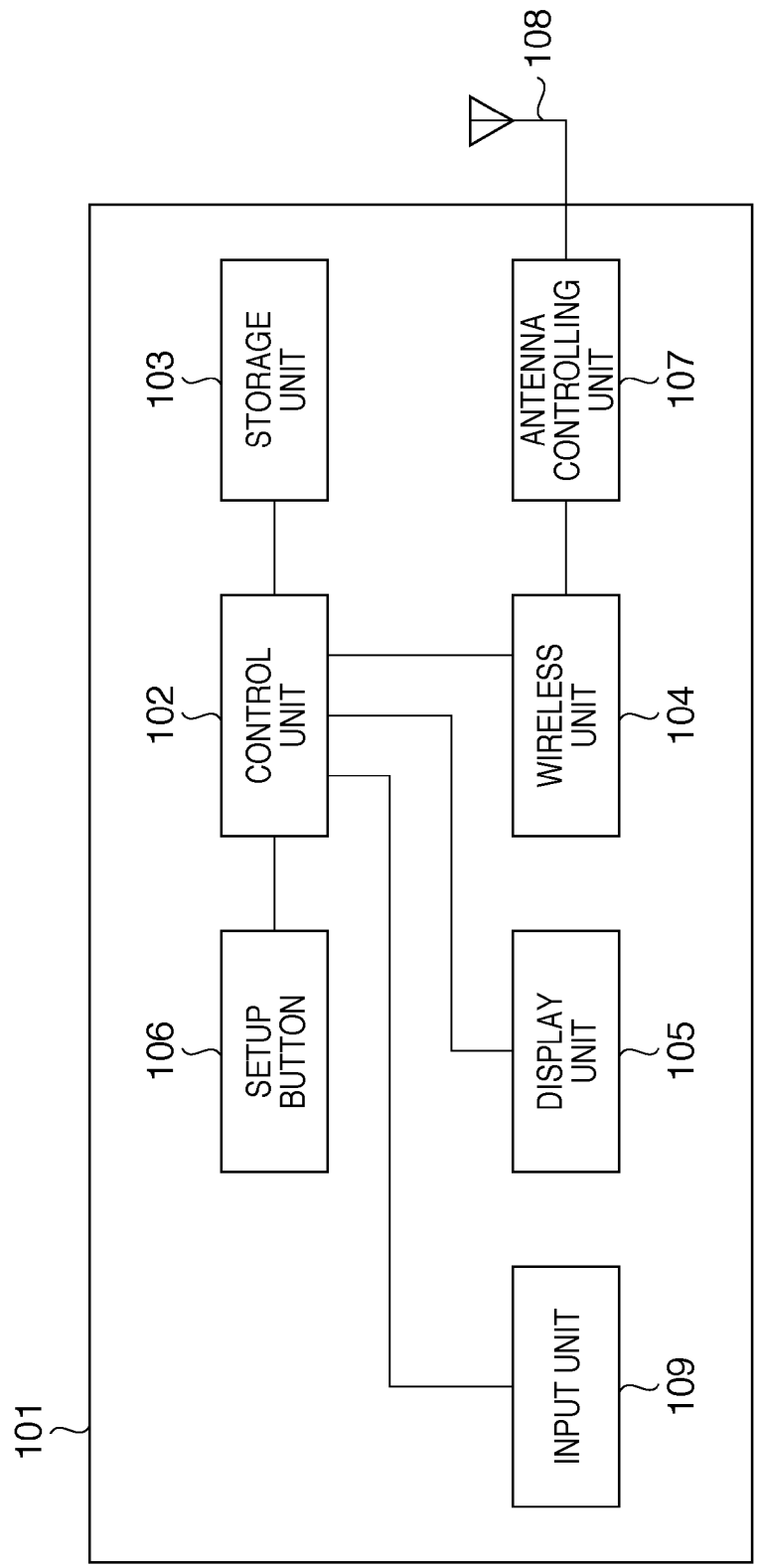
FIG. 1 is a block diagram showing a device construction according to the present invention.

FIG. 1 is a block figure representing the hardware architecture of a terminal described below. 101 represents the whole system of the terminal. 102 is a control unit that controls the whole system by executing a control program stored in a storage unit 103. The storage unit 103 for storing the control program executed by control unit 102 and information such as communication parameters. Each operation described later is conducted by the execution of the control program stored in the storage unit 103 by control unit 102. 104 is a wireless communication unit for conducting wireless communication. 105 is a display unit for conducting various types of information display and comprised of visual information output units such as LCD and LED or audio information output units such as speakers. 106 is a setting button that triggers an auto parameter configuration process. The control unit 102 starts an auto parameter configuration process that described later, when a user operation on the setting button 106 is detected. 107 is an antenna control unit and 108 is a antenna.

Figure 2:
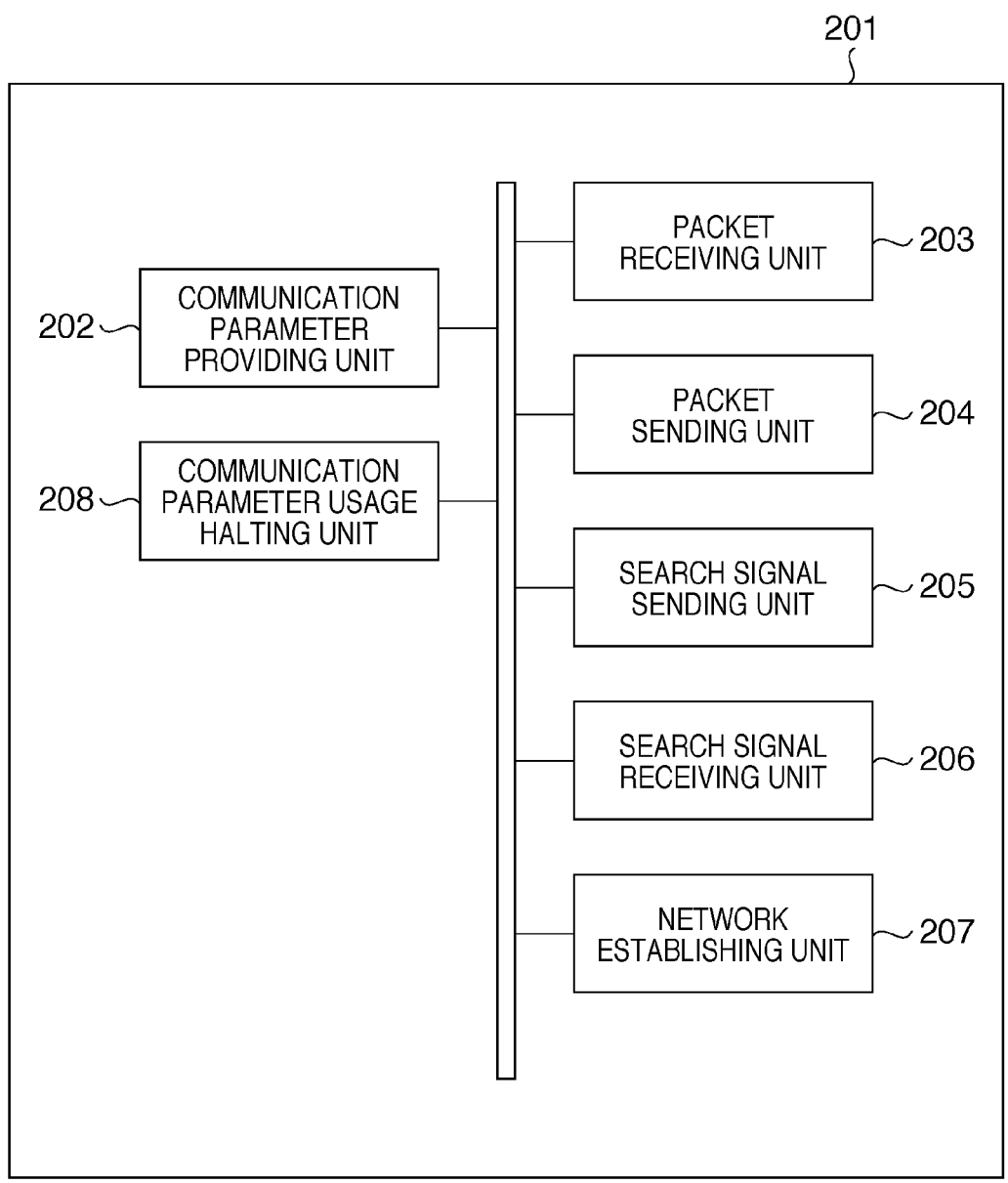
FIG. 2 is a block diagram showing the software functions in a providing apparatus of an embodiment of the present invention.

FIG. 2 is a block figure showing exemplary software functional blocks executed by a terminal that provides parameters (hereinafter: providing apparatus) in parameter configuration which is described later.

201 represents the whole terminal. 202 is a communication parameter Providing Unit that conducts the communication parameter provision processes. In present embodiment, parameters necessary for conducting wireless communication such as SSID as network identifier, encryption method, cryptographic key, authentication method, and authentication key is been provided. 203 is a packet receiving unit used for receiving packets of each type of communications. 204 is a packet sending unit used for receiving packets of each type of communications. 205 is a Search Signal Sending Unit that sends out a device search request such as probe request. Here, probe request can be used as a network detecting signal for a network wishes to be detected. Sending the probe request which is been described later, is conducted by the Search Signal Sending Unit 205. Moreover, the response to received probe request is also conducted by the Search Signal Sending Unit 205. In addition, various information of the sending device (self information) is included into the device search signal.

206 is a Search Signal Receiving Unit that controls the reception of device search signals such as probe request. Receiving the probe request which is described later is conducted by Search Signal Receiving Unit 206. Moreover, receiving the probe request response is also conducted by the Search Signal Receiving Unit 206.

207 is a Network Establishing Unit that establishes the network connection. The wireless LAN establishment of wireless parameter configuration which is described later is also conducted by the Network Establishment Unit 207.

208 is a Communication Parameter Usage Halting Unit that conducts the processes of parameter usage halting by sending a notification to receiving unit when parameter halting is conducted.

Figure 3:
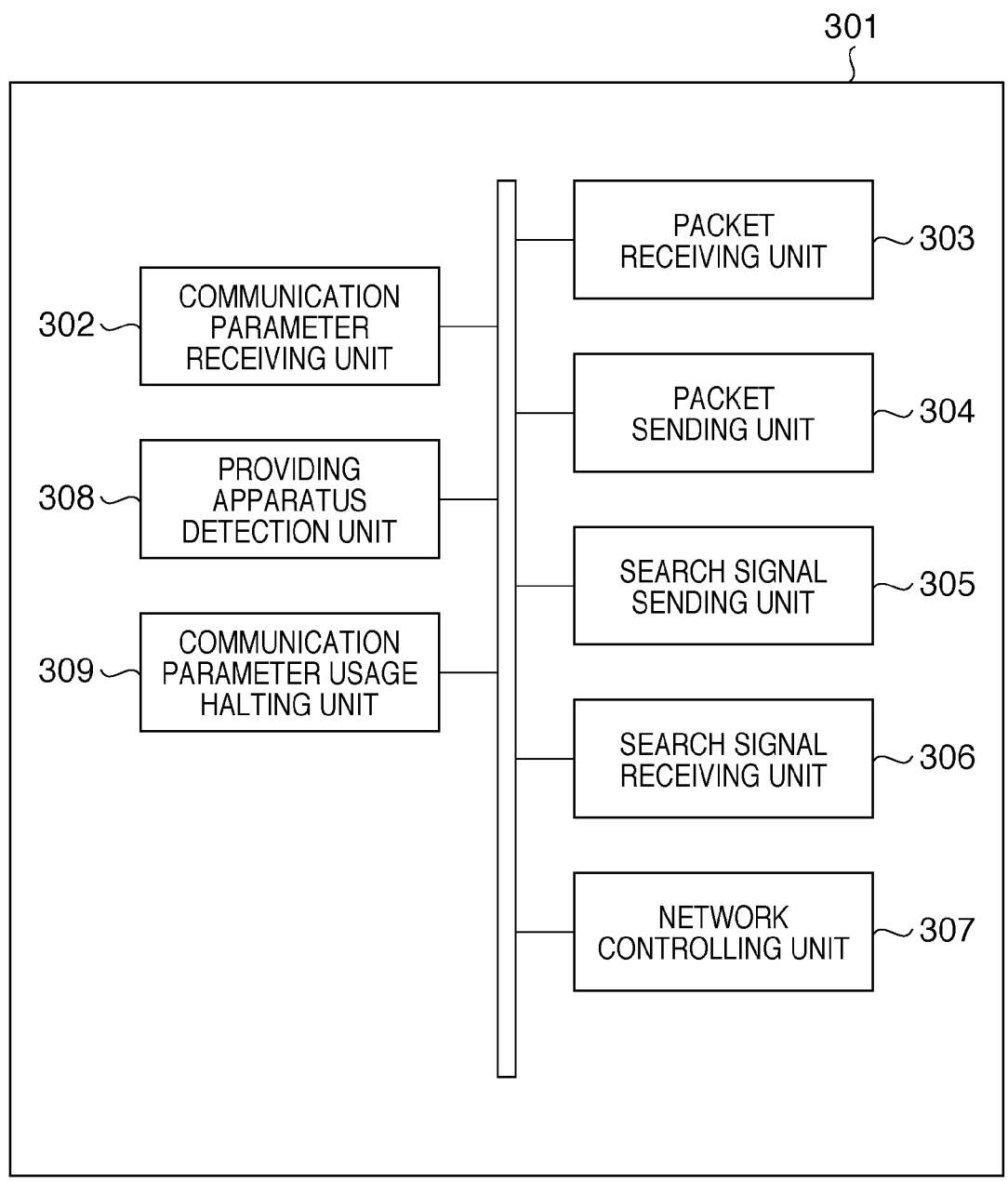
FIG. 3 is a block diagram showing the software functions in a receiving apparatus of an embodiment of the present invention.

FIG. 3 is a block figure showing exemplary software functional blocks executed by a terminal that receives the parameters (hereinafter: receiving apparatus) in parameter configuration which is described later.

301 represents the whole terminal. 302 is a communication parameter Providing Unit that conducts the communication parameter provision processes. In present embodiment, parameters necessary for conducting wireless communication such as SSID as network identifier, encryption method, cryptographic key, authentication method, and authentication key are been provided. 303 is a packet receiving unit used for receiving packets of each type of communications. 304 is a packet sending unit used for receiving packets of each type of communications. 305 is a Search Signal Sending Unit that sends out a device search request such as probe request. Here, probe request can be used as a network detecting signal for a network wish to be detected. Sending the probe request which is been described later, is conducted by the Search Signal Sending Unit 305. Moreover, the response to received probe request is also conducted by the Search Signal Sending Unit 305.

306 is a Search Signal Receiving Unit that controls the reception of device search signals such as probe request. Receiving the probe request which is described later is conducted by Search Signal Receiving Unit 306. Moreover, receiving the probe request response is also conducted by the Search Signal Receiving Unit 306.

307 is a Network Controlling Unit that controls the network connection and disconnection. The network connection and disconnection that is described later is also conducted by the Network Controlling Unit 307.

308 is a Providing Apparatus Detection Unit that detects the providing apparatus while conducting auto parameter configuration. As discussed later, detection process of the Providing Apparatus is conducted by Providing Apparatus Detection Unit 308.

309 is a Communication Parameter Usage Halting Unit that conducts the processes of parameter usage halting. In parameter usage halting discussed later is conducted by Communication Parameter Usage Halting Unit 309. In this halting process, usage of received and stored parameters is halted temporary and may allow usage again on predetermined user operation using user input unit 109 or may delete the parameters from the storage unit 103 to make parameters usage impossible. In case parameters can be enabled to use by the user, first user confirm the stored parameters, in case parameters are decided to be the expected parameters, communication become possible without re-auto configuration. On the other hand, when the parameters are deleted from the storage unit 103, preventing the undesirable communication parameter is assured, and in case malicious $3^{rd}$ party user trying to provide communication parameters, this method is effective.

Moreover, users can be allowed to choose one of these two methods by operating user input unit 109.

Additionally, all the software functional blocks have software or hardware correlation. Moreover, the above software functional blocks are merely an example, multiple functions can be implemented by one software block or one software functional block can be separated in to multiple sub functional blocks.

Figure 4:
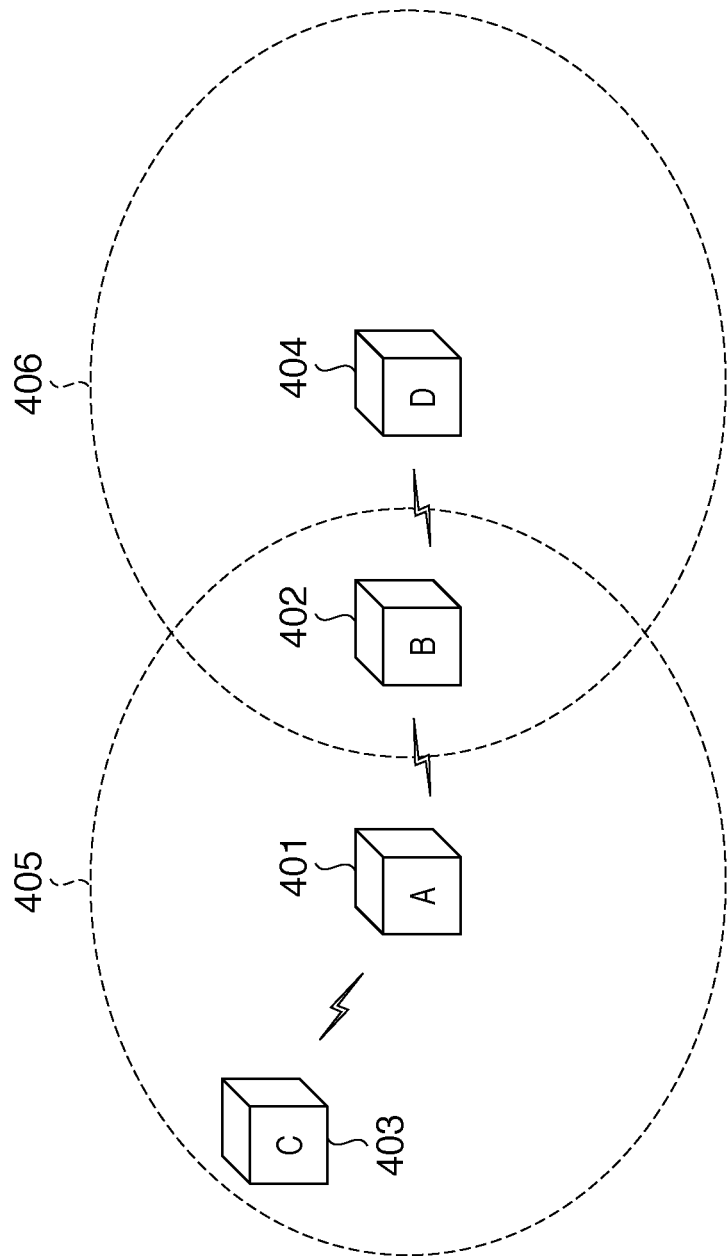
FIG. 4 shows network architecture of an embodiment of the present invention.

FIG. 4 represents terminal A 401 (hereinafter terminal-A), terminal B 402 (hereinafter: terminal-B), terminal C 403 (hereinafter: terminal-C), and terminal D 404 (hereinafter: terminal-D). Moreover, in FIG. 4 wireless LAN ad hoc network 405 (hereinafter: $1^{st}$ Network 405) established by terminal-A, and wireless LAN ad hoc network 406 (hereinafter: $2^{nd}$ Network 406) established by terminal-D is represented.

Terminal-A, terminal-B, terminal-C and terminal-D has wireless LAN communication support and conduct wireless communication between each other using wireless LAN ad hoc (hereinafter: ad hoc) communication.

Terminal-A and terminal-D are communication parameter providing apparatuses and consists of the construction of FIG. 1 and FIG. 2 as explained previously. Terminal-B and terminal-C are communication parameter providing apparatuses and consists of the construction of FIG. 1 and FIG. 3 as explained previously.

In the storage unit 103 of terminal-A the communication parameters (hereinafter: $1^{st}$ communication parameters) necessary for conducting data communication in $1^{st}$ network 405 is stored. Also, in the storage unit 103 of terminal-D the communication parameters (hereinafter: $2^{nd}$ communication parameters) necessary for conducting data communication in $2^{nd}$ network 406 is stored.

Here, a case where terminal-A and terminal-B is conducting communication parameter auto configuration after providing terminal-C $1^{st}$ communication parameters from terminal-A, and almost at the same time terminal-D is also conducting communication parameter auto configuration is considered.

Additionally, in present embodiment B is positioned so that it can receive wireless signal from both terminal-A and terminal-D. In other words, terminal-B exists in a point where $1^{st}$ network 405 communication areas intersect with $2^{nd}$ network 406 communication area.

Moreover, terminal A conduct auto parameter configuration with terminal B with the same parameter used for constructing the $1^{st}$ network with terminal C.

Figure 5:
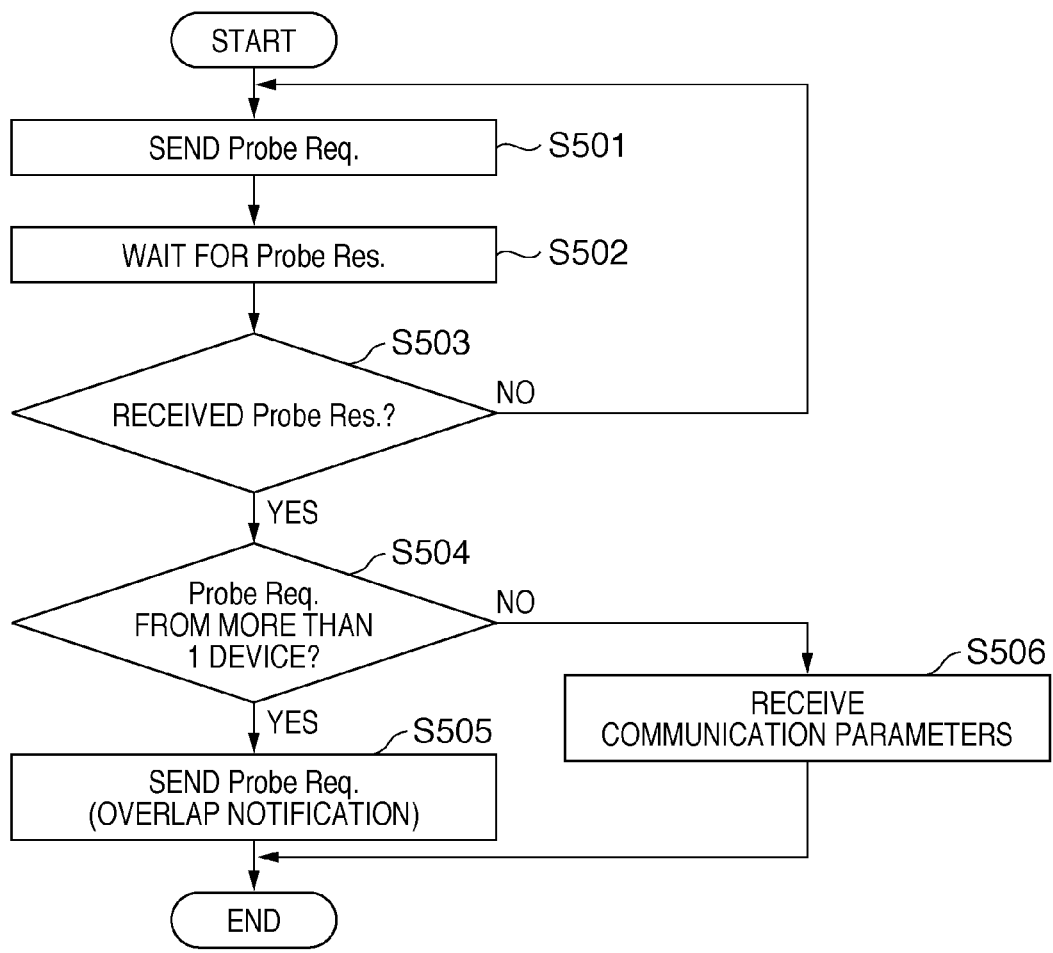
FIG. 5 is a flowchart showing a process flow in a receiving apparatus in auto parameter configuration.

FIG. 5 is a flowchart that describes the process flow of receiving apparatus when auto parameter configuration is executed. When the setting button on receiving apparatus is operated, the flow represented in FIG. 5 started.

After starting the process, the Search Signal Sending Unit 305 of receiving apparatus sends out the probe request (S501).

Then, the Search Signal Receiving Unit 306, wait for a predetermined time interval for probe response which includes the information from providing apparatus used for communication parameter auto configuration. (S502)

After waiting the predetermined time interval, Providing Apparatus Detection Unit 308 verifies the number of providing apparatus that sent the probe response with additional information for auto communication parameter configuration within the time interval of step S502.

In case there are no probe responses from providing apparatuses with additional information for communication parameter auto configuration, return to step S501, and again sends out the probe request (S503).

In case there are probe responses from providing apparatuses with additional information for communication parameter auto configuration, check whether probe response is received from more than 1 providing apparatus. (S504)

In case probe responses with additional information are received from more than 1 providing apparatuses, Providing Apparatus Detection Unit 308 detects the detection overlap occurred due to a plurality of providing apparatuses and proceeds to step S505.

Search Signal Sending Unit 305 broadcasts a probe request with additional information of the overlap of providing apparatuses and concludes the process (S505). Due to this broadcast, the fact that there is a plurality of providing apparatuses can be notified to other terminals.

In case probe response with additional information is received from only 1 providing apparatus, Providing Apparatus Detection Unit 308 recognize the providing apparatus and proceed to Step S506 to receive communication parameters.

Communication Parameter Receiving Unit 302, is identified the network identification of the network established by providing apparatus from the probe response, join to the aforementioned network and request for communication parameters from providing apparatus. This request, which is explained later, is generated by sending the starting message of auto configuration. Then, after receiving the communication parameters from the providing apparatus and storing it to the storage unit 103, the process concludes (S506).

Additionally, in step S505 Search Signal Sending Unit 305 of receiving apparatus may only send the probe request only to the providing apparatus that sent the probe response with additional information.

Figure 6:
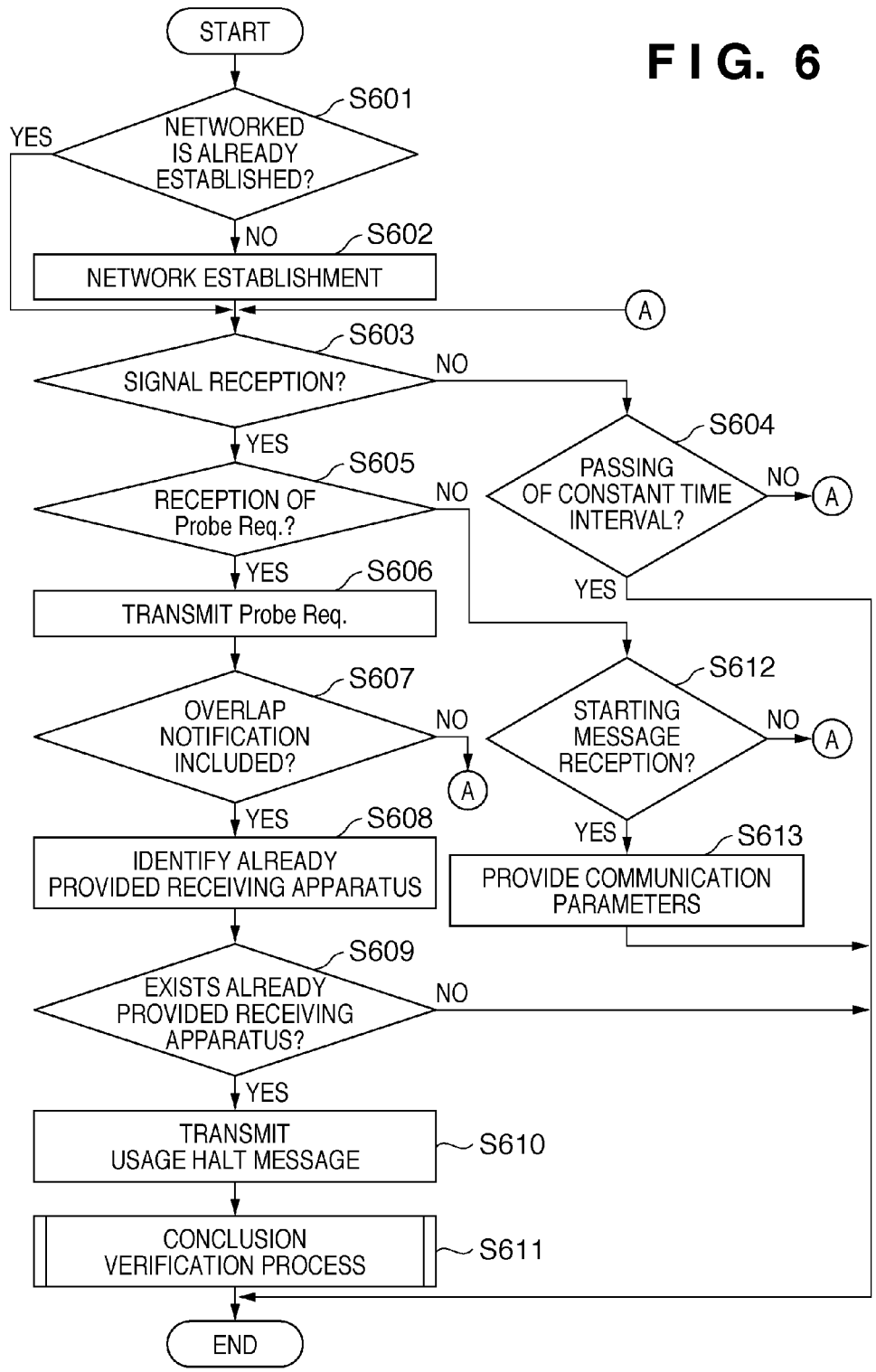
FIG. 6 is a flowchart showing a process flow in a providing apparatus in communication parameter auto configuration is conducted.

FIG. 6 is a flowchart showing the process flow of providing unit when communication parameter auto configuration is conducted. When the user operates the setting button of the providing apparatus the process as shown in FIG. 6 is initiated.

The Network Establishing Unit 207 of providing apparatus checks whether or not the 1st network for ad hoc communication is established or not, if the 1st network is not being established already, establishes the network (S601, S602).

After constructing the network, receiving apparatus wait for a constant time interval to receive wireless signals from surrounding devices (S603). In case no signal is received after the constant time interval, the process is terminated (S604). In case a constant time is not being passed, returned to step S603, and again waits for wireless signals.

When a wireless signal is received, the Search Signal Receiving Unit 206 detects whether or not received wireless signal is a probe request.

In case the received signal in Step S605 is not a probe request, communication parameter providing unit 202 determines whether received signal is a communication parameter auto configuration initiating message or not (S612).

In case the received signal is a communication parameter auto configuring initiating message, communication parameter providing unit 202 provides communication parameters to the receiving apparatus that sent the initiating message (S613).

In step S613, when communication parameter providing unit 202 finished sending communication parameters to the receiving apparatus, information such as MAC address, that allow identifying the receiving apparatus which received the communication parameters is saved into the storage unit 103.

In case received signal is not an auto parameter configuration initiation message, return to the step S603 and again wait for a wireless signal.

In case the received signal in Step S605 is a probe request, probe response with additional information for communication parameter auto configuration is sent by the Search Signal Sending Unit 205 (S606). In addition, probe response with additional information for communication parameter auto configuration is the probe response sent at a time communication parameter auto configuration process is being conducted. In case a probe request is received at a time communication parameter auto configuration is not conducted a probe response without additional information for communication parameter auto configuration is sent.

After sending the probe response, communication parameter usage halting unit 208 detects whether providing apparatus overlapping information contains or not in the additional information received with the probe request (S607).

In case providing apparatus overlapping information is not contained in the additional information, return to step S603 and wait for wireless signals.

In case providing apparatus overlapping information is contained in the additional information, communication parameter halting unit 208 refer to storage unit 103, determines whether receiving apparatus already received communication parameters or not. Then, in case there are already communication parameters received receiving apparatuses, these receiving apparatuses are determined (S608).

In case there are no receiving apparatus already communication parameters are provided, the process is concluded (S609).

In case communication parameter provision has already conducted receiving apparatus is detected, communication parameter usage halting unit 208 a message that notify not using the parameters provided is sent to the receiving apparatus (S610). Usage halt message, may uni-cast to each receiving apparatuses or may be broadcasted to the receiving apparatuses.

After sending the usage halt message, the communication parameter usage halting unit 208 conducts the halt confirming process, which is explained later (S611).

Additionally, in FIG. 6, providing apparatus get informed by the receiving apparatus whether providing apparatus are overlapped, however providing apparatus may detect providing apparatus overlap by detecting the other providing apparatus on its own. Here, providing apparatus sends out a probe request, in case probe response with additional information for communication parameter auto configuration is received, the existence of surrounding providing apparatus can be detected. Otherwise, replying to probe request sent by other receiving apparatus, with a probe response with additional information for communication parameter auto configuration, and when the aforementioned probe response received, detecting the surrounding providing apparatus may conducted.

Figure 7:
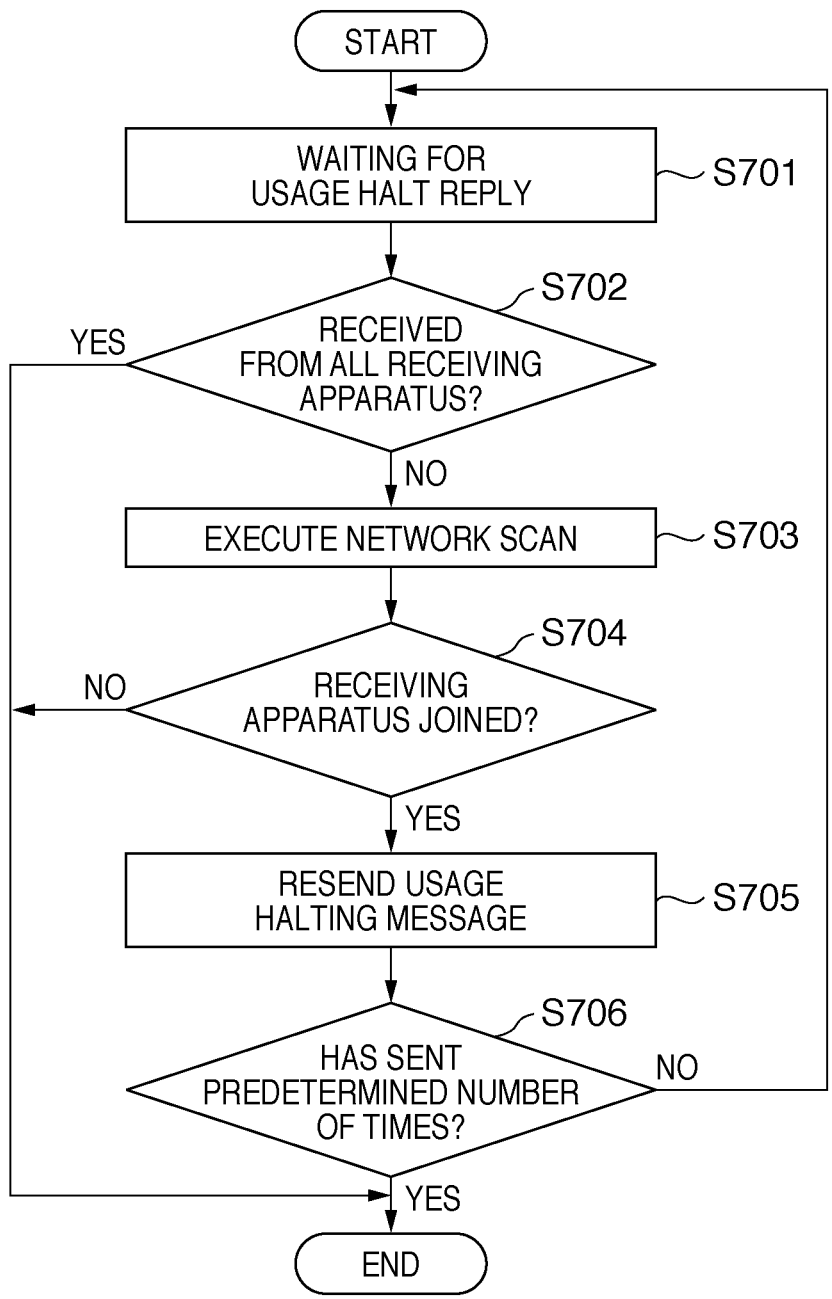
FIG. 7 is a flowchart showing a process flow in a providing apparatus when halt confirmation process is conducted.

FIG. 7 is a flowchart showing a flow of halt confirmation process when providing apparatus ends the auto parameter configuration process executed in step S611 in FIG. 6.

The process shown in FIG. 7 is started when providing apparatus sends out the usage halt massage.

After sending the usage halt message, communication parameter usage halting unit 208 waits for a constant time to receive the usage halt notification message from the receiving apparatus (S701).

In case every receiving apparatuses provided with parameters, reply the usage halt notification message within the constant time, the providing apparatus ends the process (S702).

In case receiving apparatuses already provided with parameters are not sending usage halt notification even after the constant time, communication parameter usage halting unit 208 conducts a network scan (S703). Providing apparatus conduct the scan by sending a probe request and checking whether or not probe response is received or not.

Based on the network scan results, in case there are no terminals participating to the network constructed by the providing apparatus, the process of providing apparatus is concluded (S704).

Based on the network scan results, in case there are terminals participating to the network constructed by the providing apparatus, communication parameter usage halting unit 208 resend the usage halt message (S705).

After resending the usage halt message return to step S701, and wait for usage halt notification message. In case repeating sending the usage halt message predetermined number of times, the process of providing apparatus is concluded (S706).

FIG. 8 is a flowchart describing a communication parameter usage halting process flow of the receiving apparatus. When the receiving apparatus receives the usage halt message from providing apparatus, the process in FIG. 8 is initiated.

Communication parameter usage halting unit 309 of receiving apparatus sends the usage halting reply to providing apparatus (S801).

After communication, the receiving apparatus leaves the aforementioned network using the network control unit 307 (S802).

After leaving, the communication parameter usage halting unit 309 discards the communication parameters saved in storage unit 103 provided by the providing apparatus (S803).

Additionally, instead of the method in step S803, a method that allows identifying usage of the received communication parameters from providing apparatus is not possible, may be used. As an example, let the received apparatus recognize the parameters can not be used temporary, by adding information that indicates the aforementioned parameter can not be used may be given. In this case, when receiving apparatus received the parameter from the same providing apparatus enabling the parameters saved in the storage unit 103 by removing the information that indicating unused may be conducted. Additionally, user may be allowed to change the information indicating parameters are not in use, saved in storage unit 103, by using the user input unit 109.

FIG. 9 is a sequence diagram representing the functionality of each terminal.

In the present embodiment of the invention, terminal-A and terminal-B is conducting communication parameter auto configuration after providing the terminal-C $1^{st}$ communication parameters from the terminal-A, and almost at the same time the terminal-D is also conducting communication parameter auto configuration.

When the setting button on the terminal-D is operated by the user, the terminal-D starts the process shown in FIG. 6. When Terminal-D starts processes $2^{nd}$ network 406 is constructed (F901).

When the setting button on the terminal-B is operated by the user, the terminal-B starts the process shown in FIG. 5. Then, the terminal-B sends a probe request (Probe. Req.) to find a providing apparatus (F902).

The terminal-A that receives the probe request sent at step F902, sends a probe response (Probe Resp.) to terminal-B indicating parameter auto configuration function is supported (F903).

Also the terminal-D which received a similar probe request, sends a probe response (Probe Resp.) to terminal-B indicating parameter auto configuration function is supported (F904).

The terminal-B, which received probe responses (Probe Resp.) indicating parameter auto configuration function is supported from terminal-A and terminal-D, detects providing apparatus overlapping. After the detection, a probe request including information that indicates the terminal-B detected a providing apparatus overlapping is broadcasted and concluded the process (F905).

The terminal-A which received the probe request sent in step F905, send a usage halt message to terminal-C which has already undergone parameter provision, and starts the process of FIG. 7 (F906).

The terminal-D which received the probe request sent in step F905, conclude the communication parameter auto configuration process (F907).

The terminal-C which received the usage halt message sent in step F905, after sending a usage halt reply to the terminal-A (F908), leaves the $1^{st}$ network 405 (F909).

The terminal-A which received the usage halt reply sent in step F908, leaves the $1^{st}$ network 405 and ends the communication parameter auto configuration process (F910).

As above, providing apparatus sends parameter usage halt message to already parameter provided receiving apparatuses, in the communication parameter auto configuration process in case providing apparatus are overlapped. By conducting such procedures, receiving apparatus using parameters from unexpected providing apparatus and getting connected to wrong networks can be prevented. Thus, conducting the communication parameter auto configuration safely and surely is possible.

Moreover, when receiving apparatus receives a usage halt notification from providing apparatus, the usage of parameters received from providing apparatus is automatically stopped. Thus, preventing unnecessary connections of the receiving apparatus to restricted networks become possible, while making the communication parameter auto configuration more convenient.

Above, a preferred embodiment of the present invention is described, and it is just an example for describing the present invention, and it should be noted that the technical scope of the present invention is not limited by above described exemplary embodiment. There can be various modifications to the preferred embodiments within the scope of the invention.

As an example, in the above explanation of the embodiment, probe request and probe response is used, however the invention is not limited to this signal, instead of any signal that provide similar functionality can be used.

Moreover, in above Wireless LAN communication according to IEEE 802.11 standard is used for explanations. However, present invention can be implemented with wireless systems such as wireless USB, MBOA, Bluetooth, UWB and ZigBee. Moreover, it can be implemented on systems such as power cables based communication called PLC (Power Line Communication), LAN and etc.

Here MBOA stands for Multi Band OFDM Alliance. Moreover, USB includes wireless USE, wireless 1394, WINET, etc.

Moreover, as communication parameters identifier, encryption method, encryption key, authentication method, authentication key were given as examples. It is obvious that it is possible to include other information as communication parameters.

It is obvious even without mentioning, the objectives of current invention can be achieved by providing a storage media that stores software program codes implementing above-mentioned embodiment, to a system or apparatus. The computer (Or CPU, MPU) of the system or apparatus reads out and executes the program codes the program codes stored in the storage medium. In this case, the program code read out from the storage medium implement the functions of the above-described embodiment by themselves, and the storage medium that stores the program codes constitutes the present invention.

As examples of storage media used for recoding the programming code are such as Floppy Disk, Hard Disk, Optical Disk, CD-ROM, CD-R, Electromagnetic Tap, Nonvolatile Memory Cards, and ROM.

In addition to the case in which the functions of the above-described embodiment are implemented when the computer executes the readout program codes, the present invention incorporates the following case. That is, the functions of the above-described embodiment are implemented when the operating system (OS) running on the computer performs part or all of the actual processing based on the instructions of the program codes.

The present invention also incorporates the following case. That is, the program codes read out from the storage medium are written in the memory of a function expansion card inserted into the computer or a function expansion unit connected to the computer. After that, the functions of the above-described embodiment are implemented when the CPU of the function expansion card or function expansion unit performs part or all of actual processing based on the instructions of, the program codes.

Using the present invention, prevention of unexpected auto-parameter configuration between devices and advancement of safety of auto parameter configuration can be conducted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-037415, filed Feb. 19, 2008 which is hereby incorporated by reference herein in its entirety.

The invention claimed is:

1. A communication apparatus comprising:
    a providing unit constructed to start a process for sharing communication parameters in response to an instruction from a user, and to provide the communication parameters to a receiving apparatus when the receiving apparatus requests transmission of the communication parameters;
    a determination unit constructed to determine whether there is a plurality of communication apparatuses to which the user instructed to start the process for sharing communication parameters; and
    a notifying unit constructed to, in case where there is the plurality of communication apparatuses to which the user instructed to start the process for sharing communication parameters, notify the receiving apparatus to which the providing unit has already provided the communication parameters of a notification that instructs the receiving apparatus to halt usage of said provided communication parameters.

2. The communication apparatus according to claim 1, wherein said notifying unit notifies each of the receiving apparatuses to which the providing unit has already provided the communication parameters of the notification that instructs each of the receiving apparatuses to halt the usage of said provided communication parameters.

3. The communication apparatus according to claim 2, wherein said notifying unit repeatedly conducts said notification for a predetermined number of times until all of the receiving apparatuses provided with the communication parameters using said providing unit reply to the notification.

4. The communication apparatus according to claim 1, wherein said determination unit determines whether or not the plurality of communication apparatuses to which the user instructed to start the process for sharing communication parameters exist using a notification sent by the receiving apparatus that is to be provided with the communication parameters.

5. The communication apparatus according to claim 1, further comprising a search unit constructed to search communication apparatuses to which the user instructed to start the process for sharing communication parameters, and
    wherein the determination unit determines whether or not the plurality of communication apparatuses exist or not based on the search result by the search unit.

6. The communication apparatus according to claim 1, wherein said providing unit concludes said parameter providing process when the determination unit determines that the plurality of apparatuses exists.

7. The communication apparatus according to claim 1, further comprising a discrimination unit constructed to discriminate whether there is a receiving apparatus with which the providing unit has already provided the communication parameters when the determination unit determines that the plurality of apparatuses exists, and
    wherein the providing unit concludes said parameter providing process when the discrimination unit discriminates that there is no receiving apparatus with which the providing unit has already provided the communication parameters.

8. The communication apparatus according to claim 1, wherein the communication parameters provided by the providing unit include a network identifier of a wireless network established by the communication apparatus, an encryption method, a cryptographic key, an authentication method, and/or an authentication key.

9. The communication apparatus according to claim 1, wherein the communication parameters provided by the providing unit are parameters for participating in an ad hoc network established by the communication apparatus.

10. The communication apparatus according to claim 1, further comprising a setting button operable by the user, and
    wherein the providing unit starts the process for sharing communication parameters when the user's operation of the setting button is detected.

11. A communication method by a communication apparatus comprising:
    starting a process for sharing communication parameters in response to an instruction from a user, and providing the communication parameters to a receiving apparatus when the receiving apparatus requests transmission of the communication parameters;
    determining whether there is a plurality of communication apparatuses to which the user instructed to start the process for sharing communication parameters; and
    in a case where it is determined in the determining step that there is the plurality of communication apparatuses to which the user instructed to start the process for sharing communication parameters, notifying the receiving apparatus to which the providing step has already provided the communication parameters of a notification that instructs the receiving apparatus to halt usage of said provided communication parameters.

12. A non-transitory computer readable storage medium storing a program which causes a computer to execute the communication method according to claim 11.

* * * * *